Feb. 11, 1930. C. O. ANDERSON 1,746,981
SHAFT BEARING
Filed Nov. 23, 1927
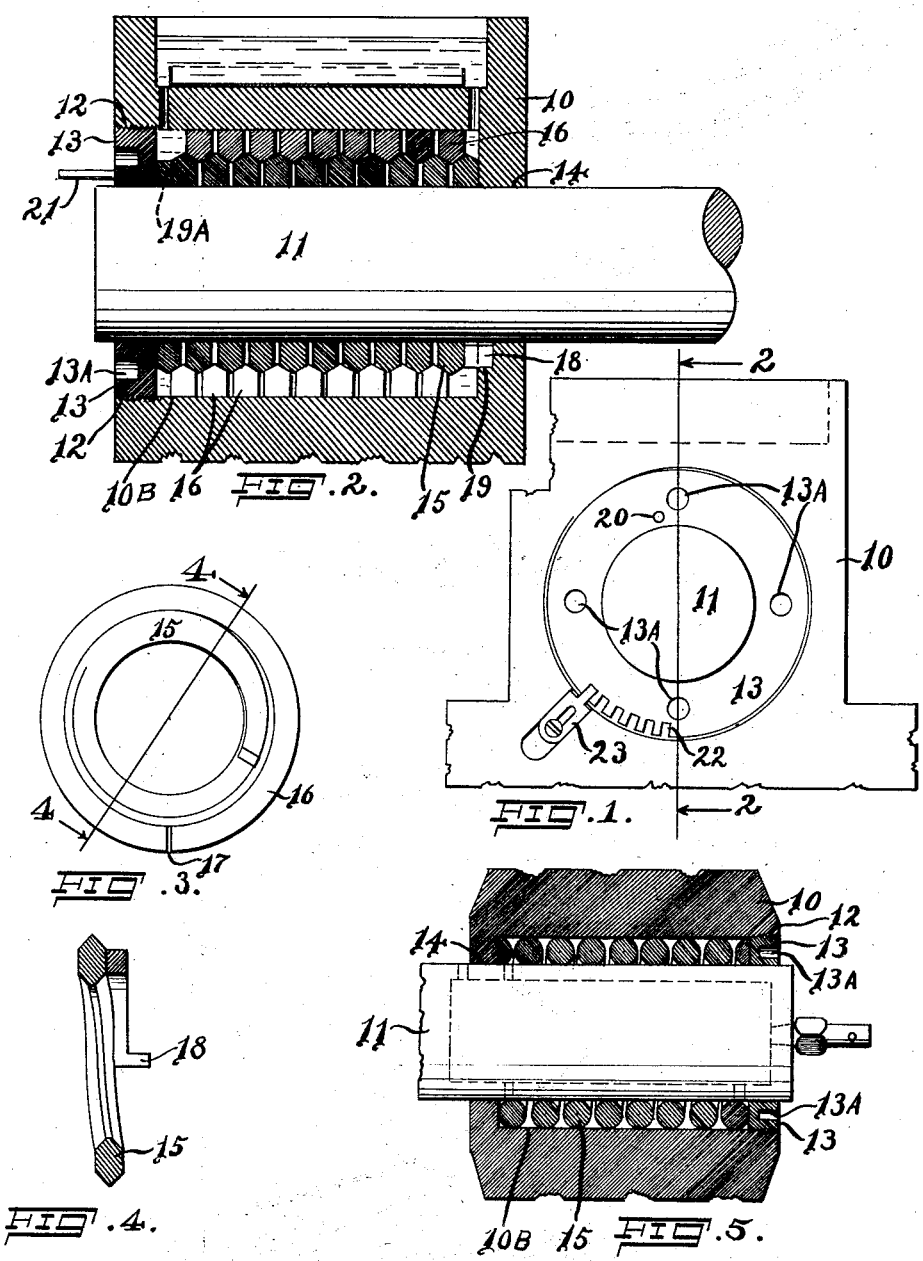
INVENTOR:
Carl O. Anderson
BY David E. Carlsen
ATTORNEY.

Patented Feb. 11, 1930

1,746,981

UNITED STATES PATENT OFFICE

CARL O. ANDERSON, OF ST. PAUL, MINNESOTA

SHAFT BEARING

Application filed November 23, 1927. Serial No. 235,363.

My invention relates to improvements in shaft bearings and the object of the invention is to provide a new and useful bearing of simple construction, inexpensive as to cost of manufacture and highly efficient. It has the feature of being easily adjustable to provide for wear and tear on shafting or on the bearing itself. Other objects and advantages will appear in the following specification, reference being had to the accompanying drawing in which,—

Fig. 1 is an end elevation of a shaft bearing of any piece of mechanism embodying my improved bearing.

Fig. 2 is a longitudinal sectional elevation of the bearing in Fig. 1 about as on line 2—2 in the latter figure.

Fig. 3 is a right hand end elevation of the improved bearing members only in Fig. 2.

Fig. 4 is a diametrical cross section of the innermost coil of my bearing device.

Fig. 5 is a modification of Fig. 2, showing a single spring type of my bearing.

Referring to the drawing by reference numerals, 10 designates a bearing housing of any machine and bored for a shaft 11. In Figs. 2 and 5 this bearing bore is designated as 10B the opening of which is threaded as 12 for a correspondingly threaded collar 13 bored centrally for the shaft. At the inner end of said main bore the housing 10 is merely a wall through which is bored a hole 14 for the shaft.

In the simplest form of my improved bearing a single helical coil spring 15 (see Fig. 5) is used and inserted in the main bore of the housing. The outer and inner diameters of said spring being such that the spring is frictionally retained rigidly within the bore and in turn holds the shaft concentric of the bore but having clearance enough to permit the shaft to be rotated freely. After inserting the spring it may be compressed some by the end collar threaded into the bore as shown and adjustable by means of a suitable spanner wrench engaging the apertures 13A in the outer face of said collar.

In Figs. 1 and 2, particularly are shown a highly efficient and preferred type of my bearing particularly useful for large heavy-duty shafts. In this type two concentric helical coil springs are used both of bar stock or heavy wire approximately quadrangular in cross section, 15 being the inner coil spring engaged directly by the shaft. 16 is the outer coil spring frictionally inclosing spring 15, the outer faces of coil spring 15 being tapered or rather ridged centrally as shown and the inner faces of spring 16 being likewise ridged outwardly and angular faces thus formed on either spring thus frictionally engaging corresponding faces on the other spring. The coils of both springs must have similar pitch but engage each other with the coils of one spring between the coils of the other. Spring 16 is removably inserted in the main bore and is made up of a series of nearly full circle coils with an opening as 17 between each section (see Fig. 3) for a purpose presently to be described. The end of coil spring 15 adjacent the inner wall of the main bore is provided with an integral projecting tongue 18 engaging a cavity 19 in the housing, while the front end of the same spring has a flat face to be engaged by collar 13 and this flat part provided with an aperture 19A (Fig. 2). 20 is an aperture in collar 13 (see Fig. 1) and through which may be inserted a suitable steel pin 21 to be aligned with aperture 19A and inserted into it also. Thus the collar 13 and spring 15 are keyed together and the collar may be screwed inwardly to coil the said spring 15 as snugly around the shaft as desired. In doing this the said spring 15 is of course shortened, bringing the coils closer together and this action causes the contacting angular faces of the outer and inner springs to climb each other and thus all the coils of the inner spring are forced inwardly and uniformly to present a desirable bearing surface to the shaft. This partial and selective closing of the coils of spring 15 creates a torgue action tending to turn collar 13 back but I have arranged to prevent this by providing radial notches as 22 (Fig. 1) in the outer perimetral part of collar 13 and which may be engaged selectively by a suitable radially movable locking pin 23 engaging in any of the notches 22.

The use of my device in its preferred and modified forms has been fully disclosed in the preceding specification.

I claim:

In a bearing device for shafts adapted to rotate concentric of a bore in a bearing housing; a helical coil spring member insertible in the bore and adjusting means insertible in the open end of said bore to compress the spring between it and the bottom of the bore, said coil being of an internal diameter to serve as a bearing for the shaft, said adjusting means comprising a collar with male threads and a bore to encircle the shaft, said bore of the bearing housing provided with female threads for said collar to engage and compress the coil spring within the bore, and means preventing the rotation of said collar comprising a locking key slidable radially of the bearing and mounted on the housing outwardly of the collar, and means on the outer face of said collar arranged to be engaged by said key; means engaging both ends of said spring simultaneously consisting of providing an aperture in the inner end of said bore of the housing and said spring provided with an integral projection engaging therein, said spring provided at its end engaged by the collar with an aperture and said collar provided with a series of apertures arranged to be alined selectively with said spring apertude and a locking pin insertible in said alined apertures.

In testimony whereof I affix my signature.

CARL O. ANDERSON.